United States Patent [19]

Kondo

[11] Patent Number: 5,129,228
[45] Date of Patent: Jul. 14, 1992

[54] ELECTRONIC ENGINE CONTROL SYSTEM

[75] Inventor: Katsuhiko Kondo, Hyogo, Japan

[73] Assignee: Mitsubishi Denki Kabushiki Kaisha, Tokyo, Japan

[21] Appl. No.: 622,912

[22] Filed: Dec. 6, 1990

[30] Foreign Application Priority Data

Dec. 11, 1989 [JP] Japan .................. 1-321801

[51] Int. Cl.⁵ .............................................. F01N 3/20
[52] U.S. Cl. .................................. 60/274; 60/277; 60/285
[58] Field of Search ................. 60/274, 277, 285

[56] References Cited

U.S. PATENT DOCUMENTS

| 4,023,359 | 5/1977 | Masaki | 60/277 |
| 4,233,811 | 11/1980 | Masaki | 60/277 |
| 4,656,829 | 4/1987 | Creps | 60/277 |

FOREIGN PATENT DOCUMENTS

| 236659 | 9/1987 | European Pat. Off. | 60/277 |
| 2643739 | 3/1978 | Fed. Rep. of Germany | 60/277 |
| 201135 | 5/1986 | Japan . | |

Primary Examiner—Douglas Hart
Attorney, Agent, or Firm—Sughrue, Mion, Zinn, Macpeak and Seas

[57] ABSTRACT

An electronic engine control system includes a microprocessor, and a variety of sensors for sensing various conditions of the engine. An exhaust gas temperature sensor is mounted to an exhaust manifold to sense the temperature of an exhaust gas discharged from an engine cylinder. A catalytic converter is connected to the exhaust manifold and has a catalyst to clean the exhaust gas. A catalyst temperature sensor is mounted to the catalytic converter to sense the temperature of the catalyst. The microprocessor is operable to analyze information including the exhaust gas temperature and the catalyst temperature so as to determine whether combustion of an air-fuel mixture takes place during engine operation. If the mixture is not combusted, then the microprocessor signals injection valves to stop injection of fuel.

10 Claims, 2 Drawing Sheets

ELECTRONIC ENGINE CONTROL SYSTEM

BACKGROUND OF THE INVENTION:

1. Field of the Invention

The present invention generally relates to an electronic engine control system and more particularly, to an improved system and method for determining whether or not combustion of an air-fuel mixture takes place during engine operation.

2. Description of the Related Art

A conventional electronic engine control system typically comprises an electronic control unit and a variety of sensors. These sensors include, among others, an airflow sensor to measure the amount of intake air, and a cylinder head coolant temperature sensor to detect an engine temperature. The electronic control unit is a preprogrammed computer operable to receive from the sensors information on various conditions of the engine such as engine temperature and engine speed. The microprocessor then analyzes this information and signals injection valves to deliver a proper amount of air-fuel mixture.

Japanese Patent Public Disclosure (Kokai) No. 61-201135 (1986) discloses an improved electronic engine control system operable to detect whether or not spark plugs are properly operated during engine operation. The disclosed prior art system includes a plurality of exhaust gas temperature sensors mounted to an exhaust manifold to detect the temperature of exhaust gases from engine cylinders, and a potentiometer for providing a reference temperature range. The reference temperature range is an exhaust gas temperature range when the spark plugs are properly operated to combust an air-fuel mixture in the engine cylinders. A central processing unit is provided to analyze the input information from the exhaust gas temperature sensors and then calculate the average exhaust gas temperature. The difference between the average gas temperature and each actual exhaust gas temperature is compared with the reference temperature range to determine whether or not each spark plug is properly operated to combust the mixture. However, the prior art system is not always reliable in that the exhaust gas temperature may increase with engine load and the speed of rotation of the engine.

SUMMARY OF THE INVENTION

Accordingly, it is an object of the present invention to provide an improved system and method for determining whether combustion of an air-fuel mixture takes place during engine operation, which is more reliable and accurate than the prior art system and method.

In accordance with the present invention, there is provided a system for electronically controlling an internal combustion engine, which includes an electronic control unit to which an exhaust gas temperature sensor and a catalyst temperature sensor are connected. The exhaust gas temperature sensor is mounted to an exhaust manifold to sense exhaust gas temperature and provide an electrical signal, preferably, in the form of a DC voltage proportional to an exhaust gas temperature as sensed. The catalyst temperature sensor is mounted to a catalytic converter which is, in turn, adapted to promote a chemical reaction between a catalyst and pollutants so as to convert the latter to water vapor and harmless gases. The catalyst temperature sensor is adapted to sense catalyst temperature and provide an electrical signal, preferably, in the form of a DC voltage proportional to catalyst temperature as sensed. This signal is, then, sent to the electric control unit.

An ignition system is connected to the electronic control unit and is operable to develop a pulse signal each time the engine or crankshaft is rotated by a predetermined amount or degree. The electronic control unit computes the speed of rotation of the engine based on the frequency of the pulse signal from the ignition system. The rotational speed and charging efficiency of the engine are, then, used to determine an operating condition or zone of the engine. Alternatively, the degree of opening of a throttle valve may be used in lieu of the charging efficiency. A map is stored in a read only memory and used to derive a nominal or ideal exhaust gas temperature-catalyst temperature ratio when the ignition system is properly operated during such an engine operation to combust an air-fuel mixture. An actual exhaust gas temperature-catalyst temperature ratio is calculated by dividing the sensed catalyst temperature by the sensed exhaust gas temperature. The difference between the actual exhaust gas temperature-catalyst temperature ratio and the nominal one is, then, compared to a predetermined reference value. If the difference value is less than the reference value, it is determined that the ignition system is properly operated to combust the mixture, and injection valves continue to inject fuel to mix with intake air. On the other hand, if the difference value is greater than the reference value, it is determined that ignition means such as spark plugs are not being properly fired. The electronic control unit then signals the injection valves to stop fuel injection. Means, preferably in the form of a warning lamp, are provided to give a warning when the injection valves are prevented from injecting fuel.

BRIEF DESCRIPTION OF THE DRAWINGS

A better understanding of the present invention may be had by reference to the following description of preferred embodiment when taken in conjunction with the accompanying drawings, in which.

DESCRIPTION OF THE PREFERRED EMBODIMENTS

While the general principles and teachings hereinafter disclosed are applicable to all internal combustion engines, the present invention will be described in detail in connection with its application to a reciprocating, fuel-injected, spark-ignition internal combustion engine.

Figure 1:
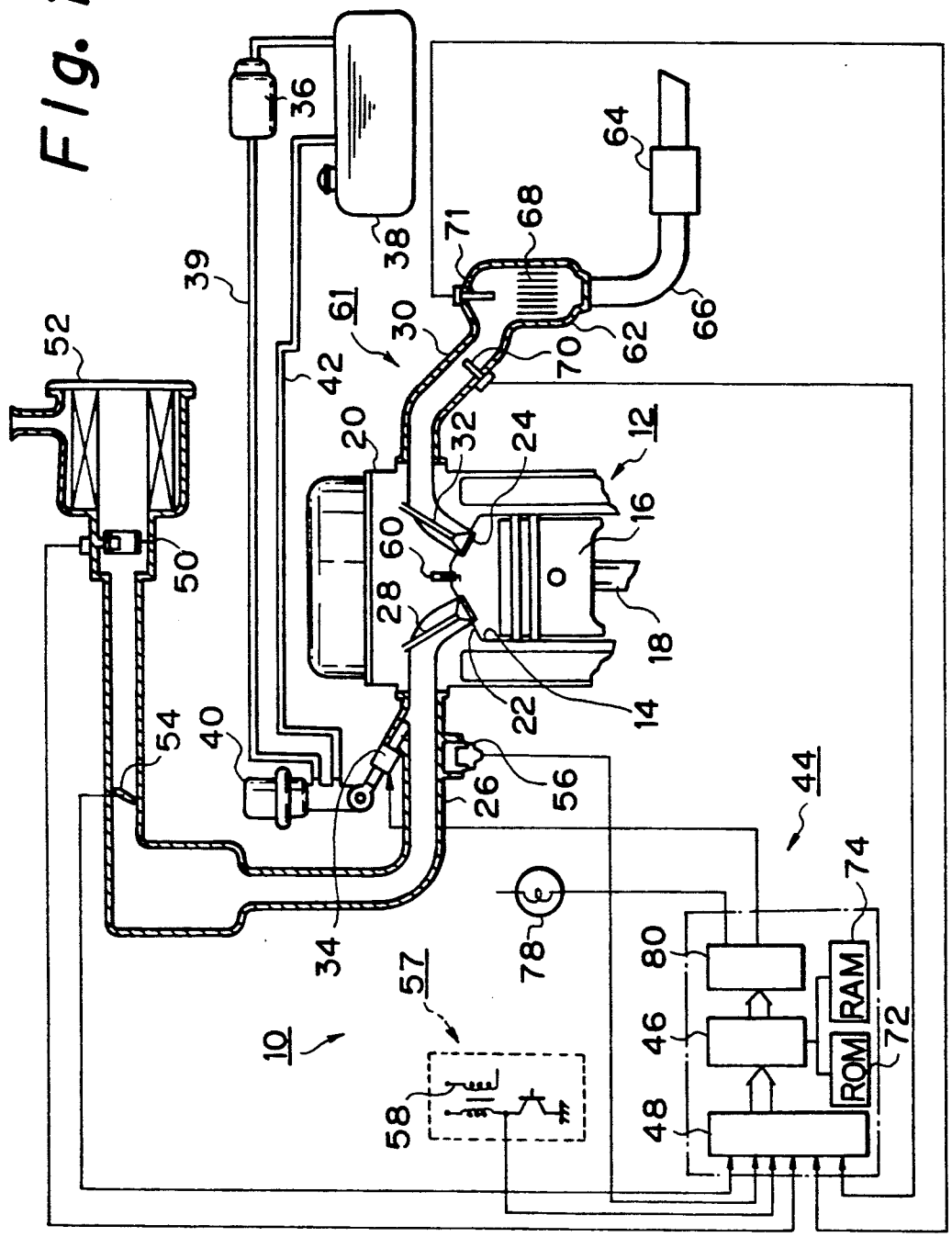
FIG. 1 is a schematic view of an electronic engine control system made according to one embodiment of the present invention, with a four-cycle internal combustion engine partly broken away for simplicity.

With reference now to FIG. 1, there is shown a schematic block diagram of an electronic engine control system 10 according to the present invention. A four-cycle internal combustion engine is generally indicated by the reference numeral 12 and includes a plurality of combustion chambers or cylinders 14 (only one is shown). A piston 16 is mounted for reciprocating motion within the cylinder 14. A connecting rod 18 is pivotally connected to the piston 16 and a crankshaft (not shown) in a manner to produce rotation of the crankshaft in response to reciprocating motion of the piston 16 within the cylinder 14.

A cylinder head 20 is mounted on the cylinder 14 and designed to define an intake port 22 and an exhaust port 24. An intake manifold 26 is connected to the cylinder 14 through the inlet port 22. An intake valve 28 is slidably mounted within the cylinder head 20. An air-fuel mixture flows in through the intake port 22 when the intake valve 28 is open. An exhaust manifold 30 is connected to the cylinder 14 through the exhaust port 24. An exhaust valve 32 is also slidably mounted within the cylinder head 20. Burned gases flow out through the exhaust port 24 when the exhaust valve 32 is open. The intake valve 28 and the exhaust valve 32 are driven with the crankshaft through a suitable link mechanism (not shown). As is conventional, this link mechanism generally includes rocker arms, valve lifters and at least one cam shaft driven by the crankshaft.

The electronic engine control system 10 is shown as a port injection system in which solenoid-operated injection valves 34 (only one is shown) are mounted to the intake manifold 26 adjacent to the cylinder head 20. A fuel pump 36 is connected to the injection valve 34 to deliver fuel from a fuel tank 38 to the injection valve 34 through a fuel supply line 39. A fuel pressure regulator 40 is connected to maintain a constant pressure at the injection valve 34 by controlling fuel flow into a fuel return line 42.

The electronic engine control system 10 includes an electronic control unit as generally indicated by the reference numeral 44. The electronic control unit 44 is a preprogrammed computer and includes a microprocessor 46 to which a variety of sensors and other components are connected through an input interface 48, as will hereinafter be described in detail.

An airflow sensor 50 is mounted within the intake manifold 26. The airflow sensor 50 is adapted to measure the amount of air flowing into the intake manifold 26 through an air cleaner 52 and provide an electrical signal, preferably, in the form of a DC voltage having a variable level proportional to the amount of intake air. This signal is then fed to the electronic control unit 44. A throttle valve 54 is connected to the microprocessor 46 and operable to control the amount of air flowing into the engine cylinder 14. An accelerator pedal (not shown) is connected to the throttle valve 54 through a suitable linkage (not shown). The degree to which the accelerator pedal is depressed controls the degree of rotation of the throttle valve 54. An engine temperature sensor 56 is, preferably, in the form of a thermistor and is mounted to the intake manifold 26 to detect cylinder-head coolant temperature or engine temperature. The engine temperature sensor 56 is adapted to develop an electrical signal in the form of a DC voltage having a variable level proportional to coolant or engine temperature. This signal is then sent to the electronic control unit 44.

An ignition system is generally indicated by the reference numeral 57 and includes an ignition coil 58 connected to a suitable source of electric power such as a battery (not shown), and a plurality of spark plugs 60 (only one is shown) mounted to the cylinder head 20. A distributor (not shown) is connected with the ignition coil 58 so as to energize the spark plugs 60. The ignition system 57 is operable to provide a pulse signal each time the engine 12 is rotated by a predetermined amount or degree and send the pulse signal to the microprocessor 46 through the input interface 48 as will hereinafter be described in more detail.

An exhaust system is generally indicated by the reference numeral 61 and includes a catalytic converter 62. The catalytic converter 62 has one end connected to the exhaust manifold 30 and the other end connected to a muffler assembly 64 through an exhaust pipe 66. The catalytic converter 62 contains a suitable catalyst 68 by which harmful pollutants in the exhaust gas are converted into water vapor and other harmless gases. A cleaned exhaust gas is then discharged to the atmosphere through the exhaust pipe 66 and the muffler assembly 64. In the illustrated embodiment, an exhaust gas temperature sensor 70 is mounted to the exhaust manifold 30 and connected to the microprocessor 46 through the input interface 48. The exhaust gas temperature sensor 70 is operable to sense exhaust gas temperature and provide a DC electrical signal in the form of a DC voltage having a variable level proportional to exhaust gas temperature. This electrical signal is, then, sent to the electronic control unit 44. A catalyst temperature sensor 71 is mounted to the catalytic converter 62 and connected to the microprocessor 46 through the input interface 48. The catalyst temperature sensor 71 is operable to sense catalyst temperature and provide a DC electrical signal in the form of a DC voltage having a variable level proportional to catalyst temperature. This electrical signal is, also, sent to the electronic control unit 44.

The microprocessor 46 is operable to analyze the input information from the airflow sensor 50 and arithmetically calculate the amount of fuel that the engine needs. As stated earlier, the ignition system is adapted to provide an electrical signal in the form of an electrical pulse each time the engine 12 or crankshaft is rotated by a predetermined amount and send this signal to the microprocessor 46. The microprocessor 46 is then operable to compute the speed of rotation of the engine 12 based on the frequency of the pulse signal and arithmetically calculate the amount of fuel required per one rotation of the engine 12. An electrical signal in the form of an electrical pulse is thereafter sent from the microprocessor 46 to the injection valve 34. The length of the electrical pulses, that is, the pulse-width, applied to the injection valve 34 determines the amount of fuel to be injected into the intake manifold 26. It will be noted that the proportion of fuel in the air-fuel mixture should be high when the engine temperature is low. The pulse-width is subject to variation depending upon the input information from the engine temperature sensor 56. That is, the lower the engine temperature, the greater the pulsewidth. Also, it will be noted that a greater amount of fuel needs to be supplied when a vehicle is accelerated. Such acceleration of the vehicle can be detected, for example, by the degree of opening of the throttle valve 54.

Figure 2:
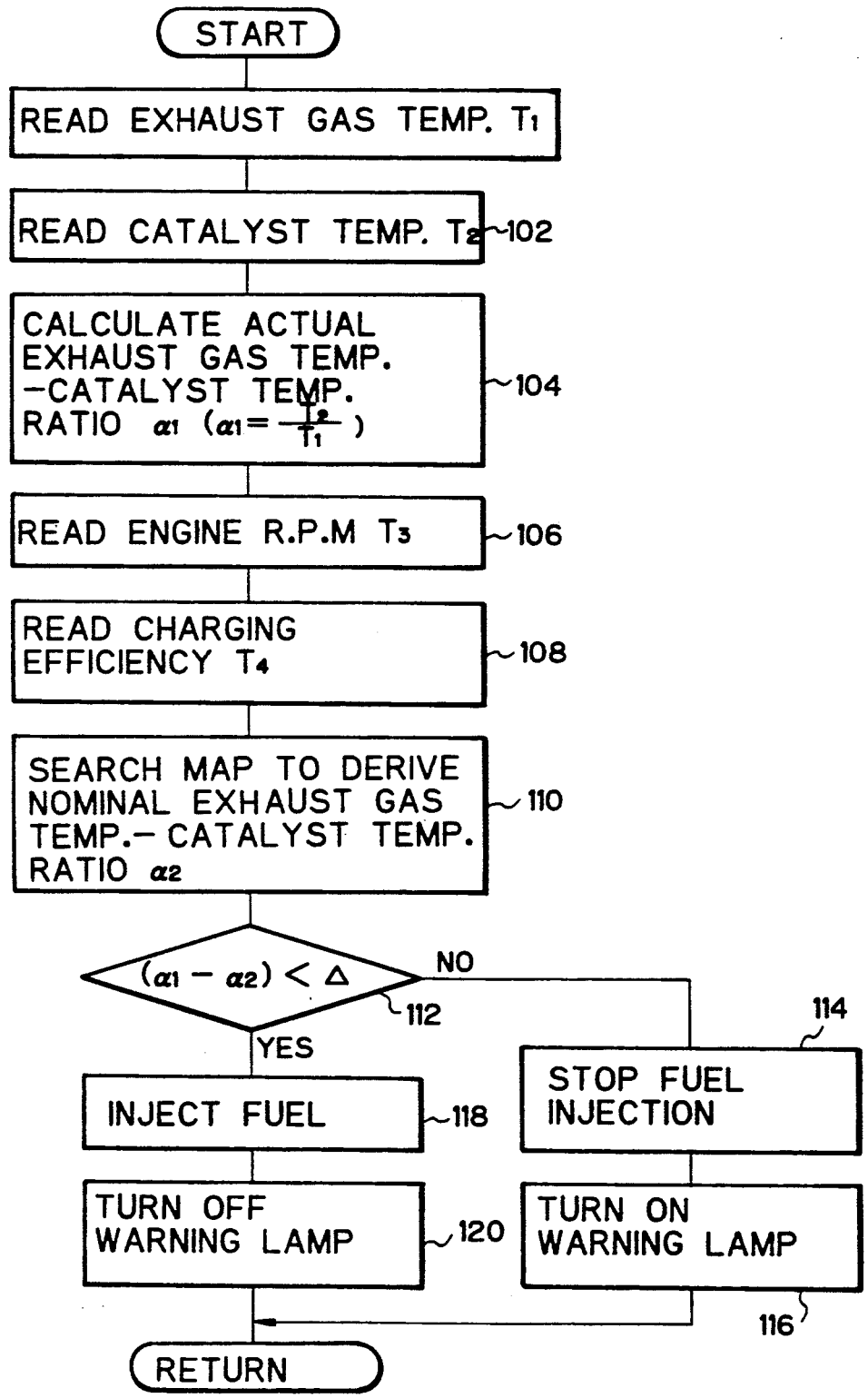
FIG. 2 is a computational flow chart for determining whether spark plugs are operated during engine operation to combust an air-fuel mixture.

The electronic engine control unit 44 includes a read only memory (ROM) 72 connected to the microprocessor 46 and adapted to store a program shown in FIG. 2, and a random access memory (RAM) 74 connected to the microprocessor 46 and adapted to tentatively store data while the microprocessor 46 is executing the program. The input interface 48 preferably includes an analog multiplexer (not shown) and an analog-to-digital converter (not shown). A variety of inputs to the analog multiplexer are converted by the analog-to-digital converter into digital form and read into the memory 74.

With reference specifically to FIG. 2, at point or step 100 of the program, an exhaust gas temperature signal from the sensor 70 is converted to digital form and read into the RAM 74 as an exhaust gas temperature data $T_1$. Similarly, at point 102, a catalyst temperature signal from the sensor 71 is converted to digital form and read into the RAM 74 as a catalyst temperature data $T_2$. The program then proceeds to a point 104 where an actual exhaust gas temperature-catalyst temperature ratio $\alpha_1$ is calculated by dividing the catalyst temperature $T_2$ by the exhaust gas temperature $T_1$. At point 106 in the program, a pulse signal is fed from the ignition system 57 to the microprocessor 46. Then, the speed of rotation of the engine $T_3$ is arithmetically calculated by the microprocessor 46 and read into the RAM 74. At point 108 in the program, the charging efficiency $T_4$ of the engine 12 is arithmetically calculated as follows:

$$T_4 = \frac{\text{Amount of air supplied to engine cylinder} \times \text{interval between crank angle signals}}{\text{Total displacement} \div \text{number of cylinders} \times \text{standard atmospheric density}}$$

The data $T_3$ and $T_4$ obtained at the points 106 and 108 are then used to determine an actual operating condition or zone of the engine 12. At point 110, a map, preferably stored in the ROM 72, is used to derive a nominal or ideal exhaust gas temperature-catalyst temperature ratio $\alpha_2$ when the spark plugs 60 are properly operated under such a condition so as to combust the mixture.

The exhaust gas temperature $T_1$ is lower when no sparks are generated than when sparks are normally generated by the spark plugs 60. This is due to the fact that unburned or lower temperature gases pass through the exhaust manifold 30. The catalyst temperature $T_2$ is higher when no sparks are generated than when sparks are normally generated by the spark plugs 60. The exhaust gases, when the fuel is not burned, include pollutants such as hydrocarbon (HC), carbon monoxide, and nitrogen oxides ($NO_x$). The catalytic converter 62 promotes a chemical reaction between the catalyst 68 and the pollutants so as to oxidize or reduce the latter. This chemical reaction results in an increase in the temperature of the catalyst 68. It will be appreciated that the value $\alpha_1$ is greater than the value of $\alpha_2$ when no sparks are generated.

At point 112 in the program, the value $\alpha_2$ is subtracted from the value $\alpha_1$. If it is found that the difference value $(\alpha_1 - \alpha_2)$ is greater than a predetermined reference value $\Delta$, then it will be decided that the spark plugs 60 are generating no sparks. The program then proceeds to a point 114 where injection of the fuel from the injection valve 34 is stopped. At point 116, the microprocessor 46 is then operable to turn on a warning lamp 78. This warning lamp 78 is connected to the microprocessor 46 through an output interface 80 as shown in FIG. 1. It will be appreciated that such a reference value varies with the operating conditions or zones of the internal combustion engine.

On the other hand, if it is found, at point 112, that the difference value $(\alpha_1 - \alpha_2)$ is less than the reference value $\Delta$, then it will be decided that the spark plugs 60 are generating sparks. The program proceeds to a point 118 where injection valve 34 is allowed to inject the fuel to mix with the air. At point 120, the warning lamp 78 is turned off.

In the illustrated embodiment, the operating conditions or zones of the engine are determined by using two different factors, namely, the speed of rotation and the charging efficiency of the engine 12. Alternatively, the degree of opening of the throttle valve 54 or the pulse-width applied to the injection valve may be used instead of the charging efficiency of the engine 12. Also, it is to be understood that the actual exhaust gas temperature-catalyst temperature ratio may be represented by subtracting the exhaust gas temperature from the catalyst temperature.

Having described the invention in detail, it will be appreciated by those skilled in the art that numerous modifications and changes may be made without departing from the spirit of the invention. Therefore, it is not intended that the breadth of the invention be limited to the specific embodiment illustrated and described. Rather, it is intended that the scope of the present invention be determined by the appended claims.

What is claimed is:

1. An electronic control system for an internal combustion engine, said internal combustion engine including at least one cylinder, an intake manifold connected to supply air to the cylinder, an injection valve mounted to inject fuel to mix with the air, and an exhaust system connected to discharge an exhaust gas from the cylinder and having a catalyst to clean the exhaust gas, said electronic engine control system comprising:

an exhaust gas temperature sensor for sensing a discrete temperature of said exhaust gas and providing a signal indicative of the exhaust gas temperature as sensed;

a catalyst temperature sensor for sensing a discrete temperature of said catalyst and providing a signal indicative of the catalyst temperature as sensed;

means for sensing an operating parameter of the internal combustion engine and providing a signal indicative of the operating parameter of the internal combustion engine as sensed; and control means for controlling the internal combustion engine in response to said signals, respectively, from said exhaust gas temperature sensor, said catalyst temperature sensor, and said means for sensing the operating parameter of the engine;

said control means including means for storing first data relating to a ratio between said signal from said exhaust gas temperature sensor and said signal from said catalyst temperature sensor when an air-fuel mixture is being properly combusted, said first data corresponding to the sensed operating parameter of the internal combustion engine, and means for comparing said first data with second data relating to a ratio between said signal from said exhaust gas temperature sensor and said signal from said catalyst temperature sensor when the internal combustion engine is actually operated so as to determine whether or not proper combustion of the air-fuel mixture takes place.

2. A system for determining whether proper combustion of an air-fuel mixture takes place within an internal combustion engine, said internal combustion engine including at least one cylinder, and an exhaust system connected to discharge an exhaust gas from said at least one cylinder and having a catalyst to clean the exhaust gas, said system comprising:

means for sensing a discrete temperature of said exhaust gas;

means for sensing a discrete temperature of said catalyst;

means for storing information as to an acceptable ratio between the exhaust gas temperature and the catalyst temperature when proper combustion of the air-fuel mixture takes place; and means for comparing said information with a true ratio between the sensed exhaust gas temperature and the sensed catalyst temperature when the internal combustion engine is actually operated so as to determine whether proper combustion of the air-fuel mixture takes place.

3. A method for determining whether an air-fuel mixture is properly combusted within an internal combustion engine, said internal combustion engine including a cylinder, an intake manifold connected to supply air to said cylinder, an injection valve mounted to said intake manifold to inject a fuel to mix with said air, and an exhaust system connected to discharge an exhaust gas from said cylinder and having a catalyst to clean the exhaust gas, said method comprising the steps of:

(a) establishing an acceptable reference value of a ratio between an exhaust gas temperature and a catalyst temperature when the air-fuel mixture is being properly combusted;
(b) sensing a discrete temperature of the exhaust gas;
(c) sensing a discrete temperature of the catalyst;
(d) calculating an actual value of the ratio between the sensed exhaust gas temperature and the sensed catalyst temperature; and
(e) comparing said actual value with said reference value to determine whether or not the air-fuel mixture is being properly combusted.

4. The method of claim 3, further including the step of inhibiting the injection valve from injecting the fuel when it is determined that the air-fuel mixture is not being properly combusted.

5. The method of claim 4, further including the step of giving a warning when the injection valve is inhibited from injecting the fuel.

6. The method of claim 3, wherein said ratio is determined by dividing the catalyst temperature by the exhaust gas temperature.

7. A method for determining whether or not proper combustion of an air-fuel mixture takes place within an internal combustion engine, said internal combustion engine including at least one cylinder, and an exhaust system connected to discharge an exhaust gas from said at least one cylinder and having a catalyst to convert pollutants in the exhaust gas into harmless gases, said method comprising the steps of:

(a) determining an operating parameter of the internal combustion engine;
(b) establishing an acceptable reference value representative of a ratio between an exhaust gas temperature and a catalyst temperature when proper combustion takes place based on the operating parameter of the internal combustion engine as determined at step (a);
(c) sensing a discrete temperature of the exhaust gas;
(d) sensing a discrete temperature of the catalyst;
(e) calculating an actual value representative of a true ratio between the exhaust gas temperature and the catalyst temperature as sensed at steps (c) and (d), respectively; and
(f) comparing said actual value with said reference value to determine whether or not proper combustion of the air-fuel mixture takes place.

8. The method of claim 7, wherein said operating parameter of the internal combustion engine is determined from a speed of rotation of the internal combustion engine and a charging efficiency of the internal combustion engine.

9. The method of claim 7, wherein said operating parameter of the internal combustion engine is determined from a speed of rotation of the internal combustion engine and a degree of opening of a throttle valve.

10. A method for determining whether or not proper combustion of an air-fuel mixture takes place within an internal combustion engine, said internal combustion engine including at least one cylinder, and an exhaust system connected to discharge an exhaust gas from said at least one cylinder and having a catalyst to convert pollutants in the exhaust gas into harmless gases, said method comprising the steps of:

(a) sensing a discrete temperature of the exhaust gas;
(b) sensing a discrete temperature of the catalyst;
(c) calculating an actual value representative of a ratio between the exhaust gas temperature and the catalyst temperature as sensed at steps (a) and (b), respectively; and
(d) comparing said actual value with a predetermined reference value representative of an acceptable ratio between the exhaust gas temperature and the catalyst temperature when an ignition system of the engine is operated to properly combust the air-fuel mixture.

* * * * *